United States Patent [19]

Holdren et al.

[11] Patent Number: 4,707,823

[45] Date of Patent: Nov. 17, 1987

[54] FIBER OPTIC MULTIPLEXED DATA ACQUISITION SYSTEM

[75] Inventors: Earl J. Holdren, Windsor, Canada; Alexander J. Owski, Redford; Paul G. Fouts, Jackson, both of Mich.

[73] Assignee: Chrysler Motors Corporation, Highland Park, Mich.

[21] Appl. No.: 887,682

[22] Filed: Jul. 21, 1986

[51] Int. Cl.[4] .............................................. H04B 9/00

[52] U.S. Cl. .......................................... 370/1; 370/4; 370/77; 370/110.1

[58] Field of Search ...................... 370/77, 110.1, 114, 370/1, 4; 364/140, 141, 142, 143, 144, 145, 146, 147; 455/608, 612

[56] References Cited

U.S. PATENT DOCUMENTS 3,270,321 8/1966 Berkowitz ............................ 370/77
4,473,901 9/1984 Jensen ................................ 370/114
4,550,416 10/1985 Rosanes ............................... 370/77

*Primary Examiner*—Joseph A. Orsino
*Attorney, Agent, or Firm*—Wendell K. Fredericks

[57] ABSTRACT

An optics fiber multiplexed data acquisition system includes an analog modular for collecting data and then transmitting the data by fiber optics cable to a memory module located at a remote location. The memory module employs means for directly accessing a computer controlled bus memory storage system.

6 Claims, 5 Drawing Figures

FIBER OPTIC MULTIPLEXED DATA ACQUISITION SYSTEM

BACKGROUND OF THE INVENTION

1. Field of the Invention

The present invention relates generally to novel data acquisition systems for use in hostile environments and particularly to data acquisition systems employing optical techniques for transferring automobile crash test data and high speed storing technique for storing the transferred data in memory in a less hostile environment such as those used in the storage system described in co-pending application, entitled "Serial Data Direct Memory Access System" of E. J. Holdren et al. Ser. No. 06/887,013, filed July 18, 1986.

2. Description of the Prior Art

In vehicle crash data acquiring systems various requirements have been proposed such as eight data channels for each seat position. Illustratively, a vehicle would have up to fifteen seating positions which would require 120 data channels. This number would be in addition to the current data channels of vehicle structural data. Current practices, includes using an onboard data acquiring unit which is connected to a remote data memory storage and debriefing unit.

An umbilical cable is used to connect the two units. If 8 channels of 12 bit data is transferred over an umbilical cable 108 wires would be needed in the cable for point to point transfer. Such a cable would be heavy and not very practical; the number of channels of data fall far short of the proposed at least 120 channels.

There are impact testing systems which use up to 50 data recorders with each recorder converting analog transient electrical signals into digital form at high sampling rates. Still again, there is a problem of weight within the vehicle and the bulkiness of a cable for transferring data to a remote area.

On board self-contained systems have been proposed wherein up to 32 channels of data can be acquired. But, these units would increase the weight of the crash vehicle and would stand a risk of being subjected to the hostile environment from which the data is to be accumulated.

SUMMARY OF THE INVENTION

As a solution to these and other problems, the instant invention comprises a data acquisition system for collecting a plurality of channels of data such as high impact "g" data at crash test sites as analog signals converting samples of data from each of the plurality of channels into digital words, the sampling being done at a predetermined rate. Codes defining the data are assigned to each word and transferred from the test site over fiber optic cable in serial form. The word and code are reconstructed at a remote location and then assigned addresses and stored in memory at a rate higher than the sampled rate. In this embodiment 32 channels are sampled and sent over a single fiber optic cable to storage. Using the principles of this invention, several systems like this embodiment could be used to achieve as many as 192 channels of data sent over 6 fiber optic cables solving the aforementioned umbilical cable problem.

The invention and its mode of operation will be more fully understood from the following detailed description, when taken with the appended drawing figures in which:

DETAILED DESCRIPTION OF A PREFERRED EMBODIMENT

Figure 1:
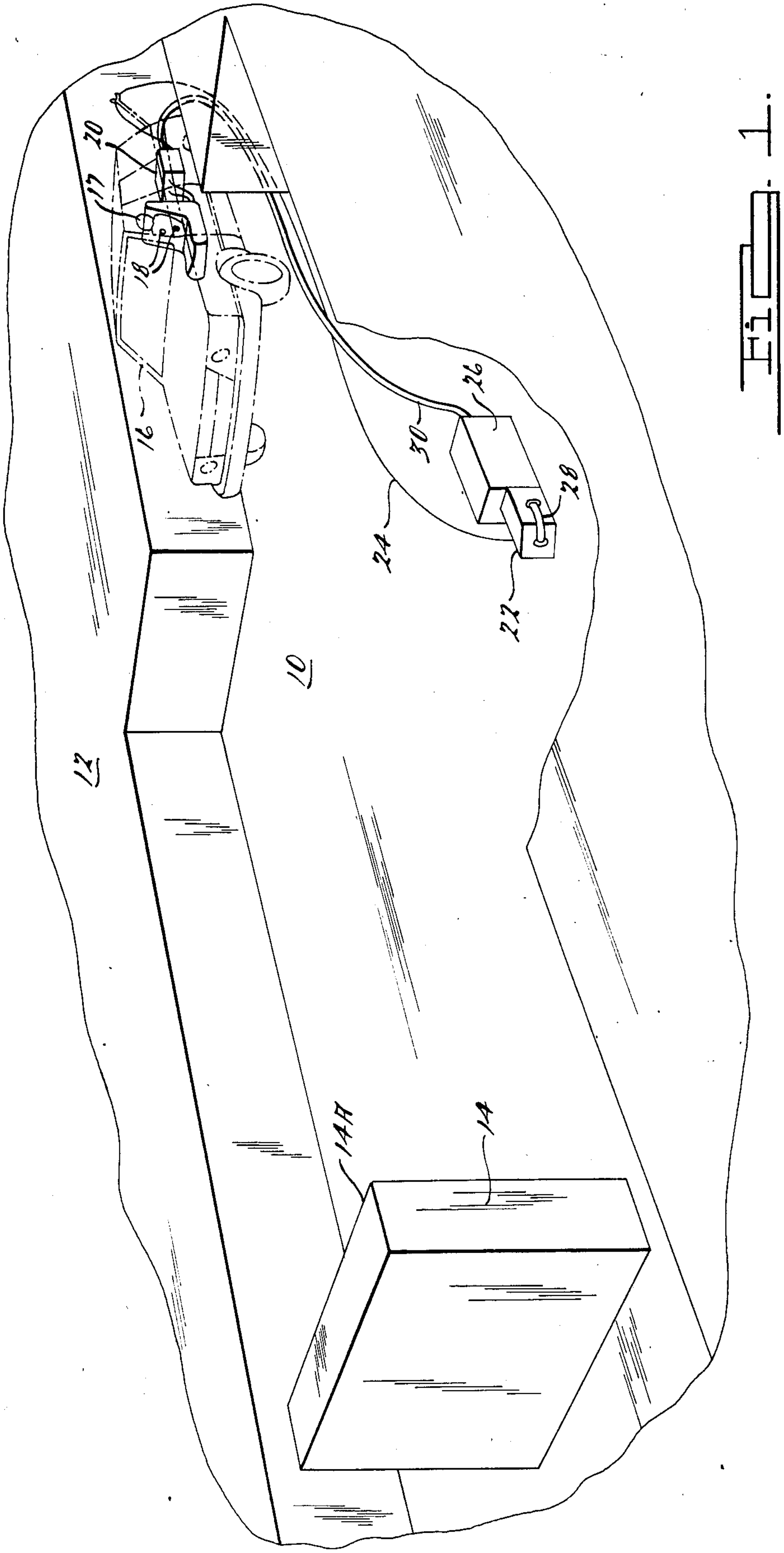
FIG. 1 is a pictorial view of a crash site illustrative of the location of the transmitting or analog module and receiving and storage components of the data acquisition system according to the invention.

Referring to the drawing, there is shown in FIG. 1 a crash test data acquisition system 10 that includes a data storing memory 22 located at a generally midpoint location of test site 12. Positioned at one end of test site 12 is an essentially immobile crash barrier 14. Vehicle 16, a remote controlled standard sedan vehicle, equipped suitably for crash test purposes is located at an opposite end of site 12 disposed to be guided to crash head-on into a front surface 14*a* of barrier 14.

Seated in vehicle 16 are usually several dummies 17, that are configured in human form (only one being shown in FIG. 1 for clarity), having a plurality of energy converting transducers 18-18 positioned at strategic locations on and within the structure of the dummies to measure and convert physical quantities into electrical quantities. Additional transducers are placed at strategic locations on vehicle 16 for providing measurements of the effects of structural elements in response to vehicle impacting against the crash barrier.

The portion of the crash test data acquisition system which interfaces with the plurality of transducers is an on-board processing and transmitting analog module 20 used for processing the electrical quantities derived from the transducers and then to transmit the processed signal from the vehicle 16 to a remote storage memory module 22.

Processed signals are transmitted to memory module 22 via an optical fiber cable 24. The processed signals are serially, digitally communicated in a bit-oriented synchronous protocol over cable 24 to a receiver circuit in remote memory storage module 22. The processed signals are encoded using a Manchester coding system which reduces transmission line cost by eliminating the customary clock wire as it includes both the clock and data in a single serial data stream.

Within memory module 22, the transmitted data is decoded, converted from serial to parallel data and then directly inserted into memory storage using a special direct memory access circuit which will be described infra. The stored data can then be debriefed and analyzed at a debriefing station 26 located at the test site or still another remote location from the test site.

In addition to employing fiber optics cable 24, an IEEE 488 cable 28 is used to form the link between remote memory storage module 22 and the diagnostic and debriefing station 26; and an RS232 cable 30 is connected between the on-board module 20 and the diagnostic and debriefing station 26 for setting up the transducers and the processing and transmission stations prior to the crash test. Before vehicle 16 is moved, or crash tested (i.e., a test event), cable 30 is disconnected from module 20.

A pre-calibration test is performed from the debriefing station 26 to the on-board module via cable 30. The pretest calibration consists of one cycle, illustratively of eight words of header information followed by 1020 samples of data zero followed by 1020 samples of software selected calibration pulses. The pre-calibration mode initially places the transducers in a data zero condition followed by establishing calibrated conditions by recording a minimum of 4096 samples in a first RAM section of memory storage module 22 via a shunt calibration resistors that are placed in the circuit.

Figure 2:
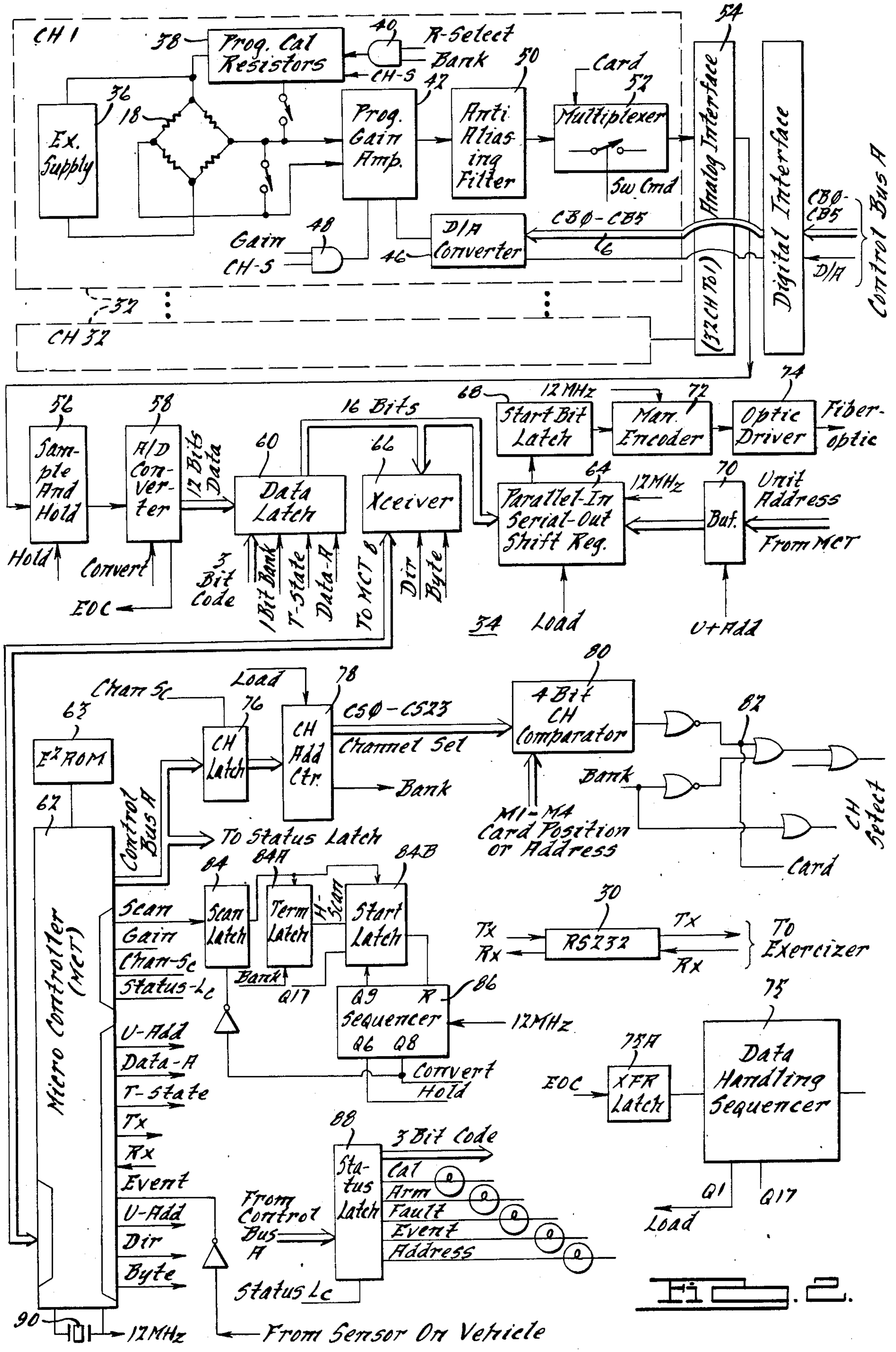
FIG. 2 provides a representation in block diagram form of the data collecting and transmitting system in accordance with the principles of the present invention.
Figure 3:
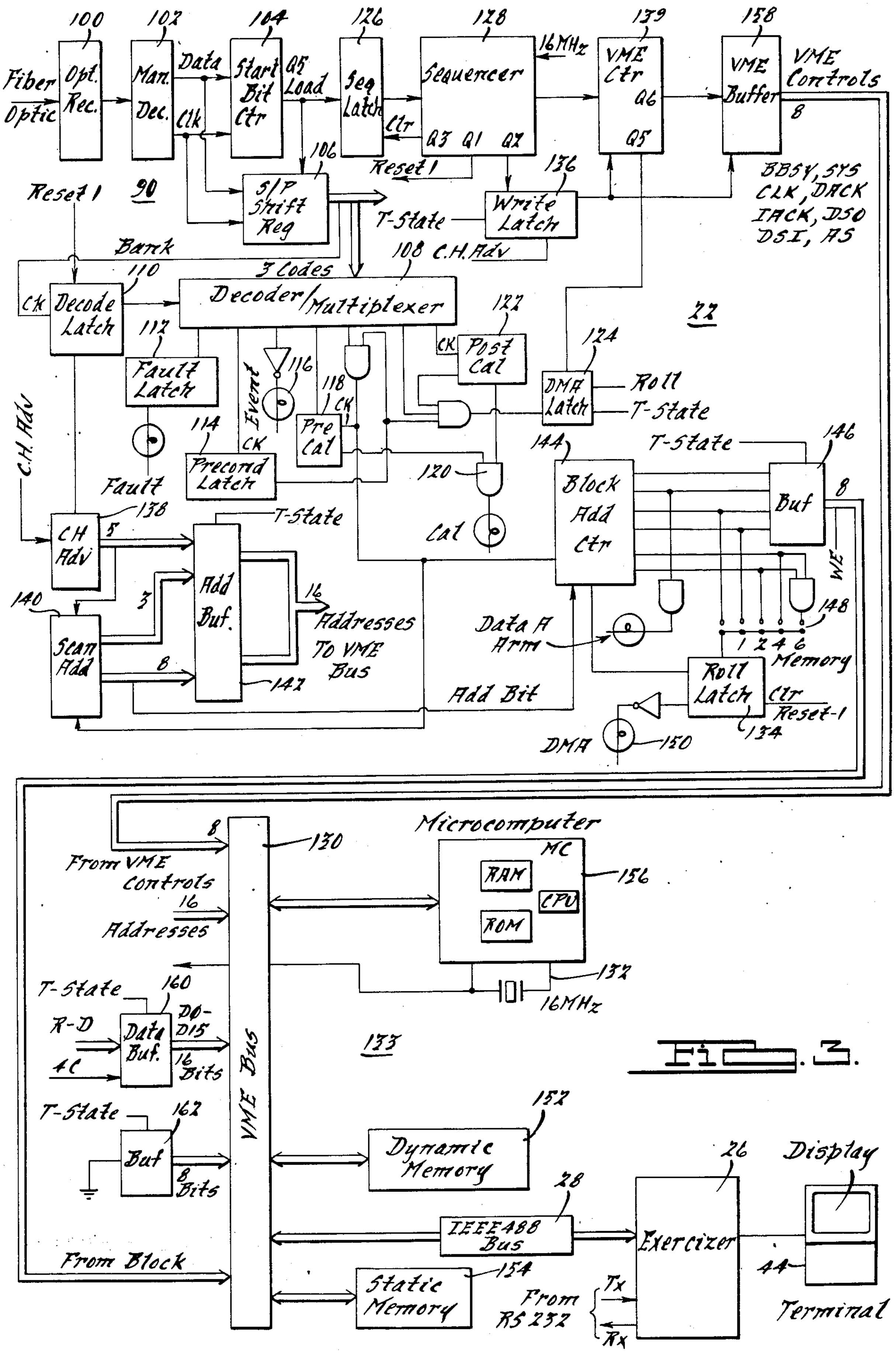
FIG. 3 provides a representation in block diagram form of the data receiving and storage system in accordance with the principles of the invention.

Referring now to FIGS. 2 and 3, there is shown in block diagram form the crash test data acquisition system 10 of this invention. FIG. 2 illustrates the analog module 20 while the memory module 22 and the debriefing station 26 are depicted in FIGS. 3.

Analog module 20, powered by suitable external D.C. voltages has thirty two (32) input ports and a single fiber optic cable output. Thirty-two (32) different transducers 18-18 may be connected to thirty-two (32) separate signal conditioning circuits 32-32 within module 20 forming thirty-two (32) separate data conditioning channels. These thirty-two signal conditioning circuits are divided among 16 cards with two circuits per card. Each of the two circuits per card is associated with one of two BANKS. This arrangement provides 16 circuits per BANK. And, by multiplexing means, these 32 signal conditioning circuits are connected to a single digital network 34 used for digitizing all thirty-two channels of transducer signal data and then converting the digitized data to a form suitable for serial transmission over the fiber optics cable 24.

Transducers 18-18 are conventional sensors used for position displacement. Some illustrative transducer types suitable for this data acquisition system are three wire units (accelerometers and potentiometers), four wire units—bridge type (accelerometers, pressure cells and load cells), thermocouples strain gages, vibration units, force units and digital transducer units. An excitation voltage (e.g. 10 volts d.c.) from an excitation source 36 is provided for each transducer 18. During an event period when the vehicle 16 of FIG. 1 is traveling towards the crash barrier 14, the transducer experiences, illustratively g-forces which cause an unbalancing of the bridge circuit, producing a change in magnitude of the transducer's output voltage. This output voltage is proportional in magnitude and equal in sign to the average rate of change of an increasing or decreasing velocity of motion of the bridge circuit in one direction. With transducer 18 attached to dummy 17, the output voltage will represent the acceleration of the dummy during the event period.

ANALOG NETWORK

Within analog module 20 of FIG. 2 connected to one side of the excitation source 36 and each transducer 18 is a conventional programmable calibration resistor network 38 comprised of a chosen number of suitable value resistors connected in a manner with suitable electronic switches which permit selectively shunting a desired calibration resistor into the transducer output lines to force a known imbalance of the bridge transducer circuit. Gate 40 connected to resistor network 38 accepts control signals such as R-SELECT and BANK from control circuits within module 20 to affect resistor programming.

An output signal of each transducer 18 or the calibration resistor network 38, a typically millivolt level signal is applied to the input of a conventional programmable gain amplifier 42. The gain of amplifier 42 is software programmed by means of control signals initiated by an operator at a keyboard terminal 44 of FIG. 3 associated with the diagnostic and debriefing station or exerciser 26. Amplifier 42 of FIG. 2 should be the type which may be programmable to provide gains, e. g., of 1, 2, 4, 8, 16, 32, 64, 128, 256 and 1024 for input signals from flat to 1 kilohertz providing output voltages not to exceed, e.g, 2.5 volts in each channel. The control lines "GAIN" and "CH-S", used for programming amplifier 42 are derived within module 20 and are applied at chosen time intervals to a gain enabling gate 48 connected to a programming terminal of the amplifier.

As part of the pre-calibration function, to compensate for any unbalance voltages of an inactive transducer which may enter the input of amplifier 42, a conventional programmable digital to analog (D/A) converter 46 is used as an automatic zero or balance circuit for providing a countering offset voltage at the input of amplifier 42. This automatic zero function is provided as part of the manual pre-calibration function. Each time a pre-calibration function is requested, an automatic zero operation is performed on each channel prior to the recording of precalibration data. A "D/A" enabling line along with a digital code, voltage set bus that provides programmable control signals are routed to each D/A converter of analog module 20 for controlling the automatic function.

The output of programmable gain amplifier 42 is filtered by a suitable anti-aliasing filter 50. Filter 50 attenuates all frequency components of the amplified transducer voltage above e.g. 3 KHz to about 48 DB/OCT. Now signals up to about 1 KHz can be collected and then further processed.

The amplified and filtered transducer voltage in each channel is routed to a suitable analog multiplexer 52. The output from each analog multiplexer 52 is connected to a common analog interface bus 54 so that time sharing the analog bus between illustratively the thirty-two amplified and filter transducer voltages takes place . The multiplexers are separated into two BANKS of sixteen switches. Circuits for selecting the BANK and the particular multiplexer within that BANK are provided. A switch control signal is generated for switching these transducer voltages on and off the analog interface bus 54. Only one filtered transducer voltage is placed on the analog interface bus 54 during a multiplexer switch period. The multiplexers, however, are of the type that do permit a scan of all the switches in both BANKS. The two BANKS of multiplexers, i.e., 32 channels, may be scanned, illustratively, at a rate of thirty-two multiplexers in about 100 microseconds.

DIGITAL NETWORK

The output from the interface bus 54 is routed to the digital network 34 employed used to service both BANKS of sixteen signal conditioning circuits 32-32. Digital network 34 includes microcontroller (MCT) 62, a sample and hold network 56, A/D converter 58, data latch 60, parallel to serial shift register 64, transceiver 66, start bit latch 68, unit address buffer 70, Manchester Encoder 72, optic driver 74, channel latch 76, channel counter 78, channel comparator 80, decision circuit 82, scan latch 84, sequencer 86, status latch 88, and data handling sequencer 75 and a transfer latch 75A associated with sequencer 75.

Microcontroller (MCT) 62 is a conventional stand alone microcontroller ROM and RAM memories, a CPU, and input/output ports which permit dedicated control function capability of peripherals such as provided by an 8751 model of Intel Corporation of Santa Clara, Calif. MCT 62 responds to factory installed software to provide pre-calibration, calibration, event's post-calibration or debriefing functions. MCT 62 also has an external $E^2$ ROM 63 used to store semi-permanently the latest system operating program. Upon power-up, this stored program is loaded and ready to run according to gain and cal. values, scan speed, amount of data and program number.

MCT 62 provides a sequence of control signals used in both the analog and digital networks. A 12 MHZ external oscillator 90 is used to control and on-chip clock of MCT 62 to provide 12 MHz clock control signal used throughout the digital network 34. For each filtered voltage that is placed on the analog interface bus 54 during, e.g., a scan of the multiplexers, a 12-bit digital number representation of that voltage is formed. Three bits of coded information is used to identify the status of the 12-bit number and a single bit code is used to identify which BANK the digital number is coming from forming a 16 bit word. To identify which onboard unit is supplying the data, an 8-bit unit code precedes the collected data.

If the system is "armed" via the RS 232 converter 30, all thirty-two channels will start a continuous scan rate in accordance with the system program stored in MCT 62. MCT 62 determines the timing of the scan rate by use of internal counters and produces a scan pulse, illustratively, every 0.0001 seconds. This scan pulse is used to clock the scan latch 84. The output of latch 84 is used to preset term latch 84A and start latch 84B.

Latch 84A enables the scanning sequence until thirty-two channels are scanned. Latch 84B releases the reset of sequencer 86. Then sequencer 86 starts counting the 12 MHz clock frequency. The 6th clock pulse (Q6) from sequencer 86 places the sample and hold network 56 in a "HOLD" mode, thus holding the voltage level from the selected channel. The 8th clock pulse (Q8) clears the scan latch 84 and also starts an A/D conversion. The 9th clock pulse (Q9) clears latch 84B and its output puts sequencer 86 in reset, thus preventing any more counts of the clock frequency.

When an A/D conversion is completed, i.e., the sampled voltage is converted into the 12-bit digital number, converter 58 issues an "END OF CONVERSION" signal (EOC) used to latch the four code and twelve data bits into data latch 60. The falling edge of EOC is applied to the clock input of transfer latch 75A. The output of latch 75A releases the reset of Data Handling Sequencer 75.

The first clock pulse (Q1)of sequencer 75 is used as a "LOAD" signal to advance the channel address counter 78 and to initiate the parallel to serial shifting of the 12-bit digital number by shift register 64. When counter 78 is advanced a "BANK" bit signal is issued. Register 64 is constantly clocked by the 12 MHz system clock signal. When no data is latched, a constant LOW is being clocked out of register 64, but when a load pulse appears, data and code is latched along with a HIGH start bit from start bit latch 68.

These serial bits are fed to Manchester Encoder 72 along with the 12 MHz system clock. the encoded data is then converter to light by optic driver 74. The fiber cable 24 has a wave length of about 820 nonometers.

The 17th clock pulse Q17 from sequencer 75 is used to clock the start latch 84B. This action releases sequencer 86 and the whole sequencer starts all over. This process continues until the "BANK" bit signal's falling edge clocks term latch 84A; and, after thirty-two channels are scanned the process is stopped. The system waits for another scan pulse from MCT 62. The BANK bit signal from the channel address counter 78 is a LOW bit for channels 1 to 16 and HIGH for channels 17 to 32. This BANK bit is used as part of the coding transmitted with each data word.

Channel latch 76 which is enabled by a CHAN-S command from MCT 62 is used primarily during diagnostics. Selected channel codes are bussed to latch 36 and then to the channel address counter 78.

From channel address counter 78, channel select codes CS0–CS3 along with the BANK bit are bussed to input ports of the channel comparator 80. There, the codes are compared to a card position address derived from hard-wired coding of the slots in a mother board in which the cards are plugged in when there is a match, an output signal is routed to the decision circuit 82. Circuit 82 provides a "CARD" signal which is routed to the multiplexer which enables one of the two signal conditioning circuits on a card and two channel select signals, one of which enables the calibration resistor 38 if required and another which latches the gain to the programmable gain amplifier 42.

Transceiver 66 is used to transmit to MCT 62 data from A/D converter 58 prior to entering the shift register 64 or to send information from MCT 62 to the shift register 64 for transfer to memory module 22 via the Manchester Encoder 72 and fiber optic driver 74. DIR, BYTE, T-State and U-ADD control signals are used to effect transceiver communication.

The analog module 20 is suitable for use, for example, in a hazardous environment. To sample thirty-two different millivolt range transducer voltages (flat to one kilohertz) within 100 microseconds per scan, samples at about 3 microseconds per sample converts the sample to a digital number in about 3 microseconds shift 12 data bits, 4 code bits and one start bit out of the shift register at about 83 nonosecond rate per bit.

Illustratively, suitable sample and hold circuit 56 and A/D converter 58 may be a model MN 376 track-hold amplifier and a MN 5246 A/D converter, both from MicroNetwork of Worcester, Mass.

Data from the analog module 20 is transferred to the memory module 22 serially over the fiber optics cable 24. Memory module 20 has a 120 VAC power source, a memory size, illustratively, of 512 K. battery backed static ram (800 milliseconds recording time at 10 KHz sampling rate and 4 megabytes of dynamic ram (6 sec recording time at 10 KHz sample rate). The system can support 6 megabytes of RAM (9 sec recording time at 10 KHz sample rate). In addition to the fiber optic interface module 20 interfaces via an IEEE488 with the Exercise computer and via RS232 to optional monitor terminals and with the analog module 20.

To identify a particular analog module 20 MCT 62 issues a specific unit address word to unit address buffer 70. Buffer 70 transfers the 8-bit address to the parallel to series shift register 64 upon a "U-ADD" command issued from MCT 62 and a "LOAD" command issued from data handling sequencer 75.

Usually during a "PRECALIBRATION" mode, the stored program in MCT 62 causes an initial scan or reading of the thirty-two channels of information, the information usually is the unit address word placed in the first thirty-two bytes of memory module 22. As is typically done, prior to sending each word, unit address or data word, the start bit from start bit latch 68 precedes the word.

MEMORY MODULE

The serial data from analog module 20 enters the memory module 22 through the optic receiver 100. Receiver 100 converts the light signals sent through cable 24 to digital electrical signals. Cable 24 illustratively is a signal graded index glass fiber core cable such as a ruggedized type HFBR-3200 Simplex Fiber Optics Cable of Hewlett-Packard.

Memory module 22 includes a receiver circuit 90 that includes means for direct memory access to a static and a dynamic memory 154 and 152, respectively, via a VME bus 130 of a VME bus computer system 133. VME Bus System 133 includes the VME bus 130, microcomputer 165 and dynamic and static memories 152 and 154, respectively.

The digitized signal is applied to the Manchester decoder 102. Decoder 102 regenerates a synchronous clock signal and serial bit representation of the data words transferred from module 20 to both a start bit counter 104 and serial to parallel shift register 106. Counter 104 is used to count the bits looking for a start bit and to latch in the succeeding 16 data bits.

At the 17th clock pulse Q5 of counter 104, a "LOAD" signal issues which causes the serial data to enter the shift register 106 and to be clocked by the decoded clock signals.

Shift register 106 reconverts the serial words representations of the sampled voltage into parallel words comprised of 12 data bits and 4 code bits, one of the code bits being the "BANK" bit. The three code bits which define the status of the 12 bit data word is bussed to decoder/demultiplexer 108. The "BANK" bit is bussed to decode latch 110 where it is used to clock latch 110 so as to generate a signal to enable decoder 108. When decoder 108 is enabled the 3-bit code is decoded either one of the seven circuits indicator circuits is activated illustratively FAULT Latch 112, PRECOND Latch 114, EVENT indicator 116, PRE CAL Latch 118, CAL indicator 120; POST CAL Latch 122 and DMA Latch 124.

The LOAD signal is also used to clock a sequencer latch 126 so as to enable sequencer 128. Sequencer 128 counts a 16 MHz clock frequency signals from a VME bus clock generator 132 for computer 156. Computer 156 is the master computer for the bus system.

The first CLOCK pulse (Q1) is a RESET-1 signal which clears roll latch 134. Roll latch 134 is used to indicate when memory is full and the system must roll back to the beginning. Latch 134 stays clear until memory full occurs. RESET-1 also is used to set decode latch 110 to begin sequence of decoding the next code bits for the next data word. The second clock pulse (Q2) clocks the write latch 136 which provides a CH ADV signal which enables CH ADDRESS counter 138 and VME counter 139.

Counter 138 counts out and its last clock pulse enables scan address counter 140. The combined output pulses from counters 138 and 140 are bussed to address buffer 142 to form a 16-bit address of the memory location for the data word that is to be placed in memory. Address buffer 142 transfers the 16-bit address into the address bus of the VME bus 130 under the command of a TRI-STATE signal issued from DMA Latch 124.

When scan address counter 140 advances to its last counter, the final clock pulse is used to enable a presettable BLOCK address up/down counter 144 used to identify which block of memory the newly addressed data will be placed in. Illustratively, the amount of data memory is expressed in terms of blocks. A block is defined as 2048 words (4096 bytes) of memory for one (1) channel. Illustratively, for 32 channels of input data, one (1) block would amount to $2048 \times 32$ or 65536 words (131072 bytes) of memory. The digital number from counter 144 identifying which block of memory is to be used is bussed to block buffer 146 and then on to the address bus of the VME bus 130 under Tri-State command.

The pre-condition code latch 114 is used to help make memory module 22 more noise resistant. A precondition bit is issued with PRECAL, POST CAL and DMA commands to prevent spurious signals from entering these circuits.

The addresses generated by the receiver circuit 90 are used to address module 156, dynamic RAM memory 152 and static RAM memory 154. These memories can be increased in size or decreased in size. The static RAM memory 154 is used as data memory and can be used with a battery back-up for data retention. Dynamic RAM memory 152 provides onboard refresh logic.

There are, illustratively 16 megabytes of address space of memory but only 6 megabytes are reserved for data memory starting at for example $800000. The amount of memory to be used can be varied. A maximum memory switch 148 can be set for the amount of memory installed. Selections are provided for, illustratively, 0.5, 1, 2, 4 and 6 megabytes of installed memory. The switches must not be set for more memory than is installed, although they could be set for less than the installed amount of memory.

As mentioned supra, WRITE latch 136 provides a CH ADV signal. When the second clock pulse (Q2) from sequencer 128 changes from a high to a low level. When, illustratively, a CH ADV signal occurs, VME counter 139 is enabled. With latch 136 set as a result of the Q2 clock pulse, the VME buffer 158 is activated initiating a WRITE pulse. Then the VME bus computer system 130 communicates its own signals over the bus to the receiver circuit such IACK-interrupt acknowledge, DACK-data acknowledge, AS-ADDRESS strobe, SYS CLK - System clock. If a DACK is not received from the bus computer system 130 at the fifth clock pulse (Q5) from VME counter 139, this Q5 pulse will be used to generate a reset signal to reset latch 136. Latch 136 is essentially used to initiate writing to memory. When the fifth clock pulse (Q5) of counter 139 occurs, the DAM latch 124 sets providing a T-state or Tri-state signal for the system and a LOCK signal to return control back to the CPU.

The data word from shift register 106 is bussed to auto buffer 160 and then onto the data bus of the VME bus 130. To permit modifying address an address modifier buffer 163 under control of the tri-state signal is used.

DMA ACCESS

For DMA circuits of memory module 22 to grasp control of the bus, a form of bus arbitration is employed. A code from decoder 108 is issued to the CPU of MC 156 requesting use of the bus. The DMA circuits wait for a response from the CPU. The CPU finishes what it is doing then it gives up control and goes to sleep. The DMA circuits send a signal to the bus that it has control. When control is returned to the CPU, the CPU resumes its function from where it left off prior to going to sleep.

A direct memory access (DMA) is in effect whenever the DMA indicator 150 is lit. This occurs when illustratively coded bits are transmitted to memory module 22 illustratively via fiber optic cable 24 indicating the status of each word. Illustratively, a code may be sent to indicate pre cal data, event data, post event data, post cal data. Upon completion of a chosen period of data collecting, further transmission is stopped. Illustratively, at the end of post-cal data transmissions, the receiver will give us control of the system and return control to the CPU of the VME bus.

CPU ACCESS

The CPU of MC 156 has access to the data memory (and is in control of the memory module) whenever a DMA access is not in effect. The CPU accesses memory to perform a data test, debrief, memory read/write test or a memory installation test. It should be noted that the only time the CPU writes to data memory is during a memory read/write test. Upon resetting the CPU program, the CPU will always gain control of the memory module and DMA operation will ease.

Operation of the system will now be described. The following initial steps are usually performed;

Mount analog module in vehicle.

Mount memory module at debriefing station.

Connect fiber optic cable between analog and memory module.

Connect IEEE 488 cable from memory module to Exerciser.

Connect RS232 cable from memory module to analog module.

Power up debriefing station.

Power up memory module 120 VAC.

Power up analog module 24 VDL immediately starts operating. Analog module 20 operates under the control of MCT 62. MCT 62 responds to commands from memory module 32 via the RS232 serial port or from terminal 44 at the debriefing station 26.

The factory installed program in memory of MCT 62 provides for individual channel gain, balance of transducers, and calibration resistor selection. Overall control of scan rate, amount of data, system diagnostics and data handling are also stored in memory of MCT 62. The system programming is also stored in $E^2$ ROM, a non volatile memory before power is turned off so that the parameters can be resumed upon system power up.

Each of the 32 channels of incoming millivolt level, flat to 1 kilohertz transducer data is independently amplified by gain amplifier 42 to a maximum of 2.5 v and filtered by anti-aliasing filter 50 to get rid of spurious frequency from about 13 KHz. Then by multiplexers 52-52, the 32 channels are sampled at illustratively a 10 KHz rate, i.e., 10 K samples per second per 32 channels equal 320 K samples per second. The 32 channels are sampled within 100 us or about 3.12 microseconds per sample.

Each sample is A/D converted by converter 58 in about 0.07 microseconds to an 12 bit number. Then 3-bits of status code presenting e.g. pre-cal latch, DMA mode, EVENT, set CPU in memory module, post, etc. are added to the 12 bit number along with a single BANK bit and at START bit forming a 16 bit word and a start bit.

Each bit of the data word is shifted serially and converted to light and sent over the fiber optics cable 24 in about 0.07 us.

Each data word is received by the memory module 22 via the fiber optics cable 24. The memory module includes circuits which converts the serial data into a series of parallel 16 bit words representing each sample of the transducer data.

The optic receiver 100 converts the light signal to a Manchester encoded signal. The Manchester decoder 102, decodes the signal into serial data and a 12 MHz clock pulse. After a start pulse is detected by start bit counter 104, serial to parallel shift register 106 reconverts the serial data into the same parallel words that were placed on the fiber optic cable 24 by analog module 20. A decoder 108 decodes the 3-bit status code to provide indications of the type data being received.

Operating off a 16 MHz clock pulse from VME bus computer system 130, sequencer 128 activates several counters, namely, the VME bus counter 139, a channel address counter 138, and scan address counter 140, a "BLOCK" counter 144.

When data is to be directly stored into memory, the sequencer must activate the DMA latch 124. When this occurs each reconstructed parallel digital word is stored in either the static RAM 54 or dynamic RAM memories under the control of a 16 MHz clock from generator 132. The CPU of the computer module 156 of the VME bus computer system is essentially put to sleep.

In the DMA mode, the channel address and scan counters 138 and 140 respectively are used to form a 16 bit address used for addressing the desired location in memory for storing the reconstructed data word. The VME counter 139 is used to provide appropriate control signals to the VME bus while the CPU of computer module 256 is asleep. The BLOCK counter 144 is used to select the particular BLOCK in memory the data word is to be stored.

After the address is formed and executed the 16 bit data word is transferred into the desired location at about a 0.002 microsecond rate.

The memory module 22 operates either under the control of the analog module (DMA mode) or under the control of the CPU in computer module 156 of the VME bus computer system. When the CPU is in control, the system responds to commands sent to it by the exerciser 26A over the IEEE-488 interface. Also, the memory module may interrupt the exerciser through the IEEE interface.

Firmware resident in the memory module provides a power up memory installation test which automatically configures the memory module for the amount of memory installed, a data integrity test and a channel debrief routine.

Figure 4:
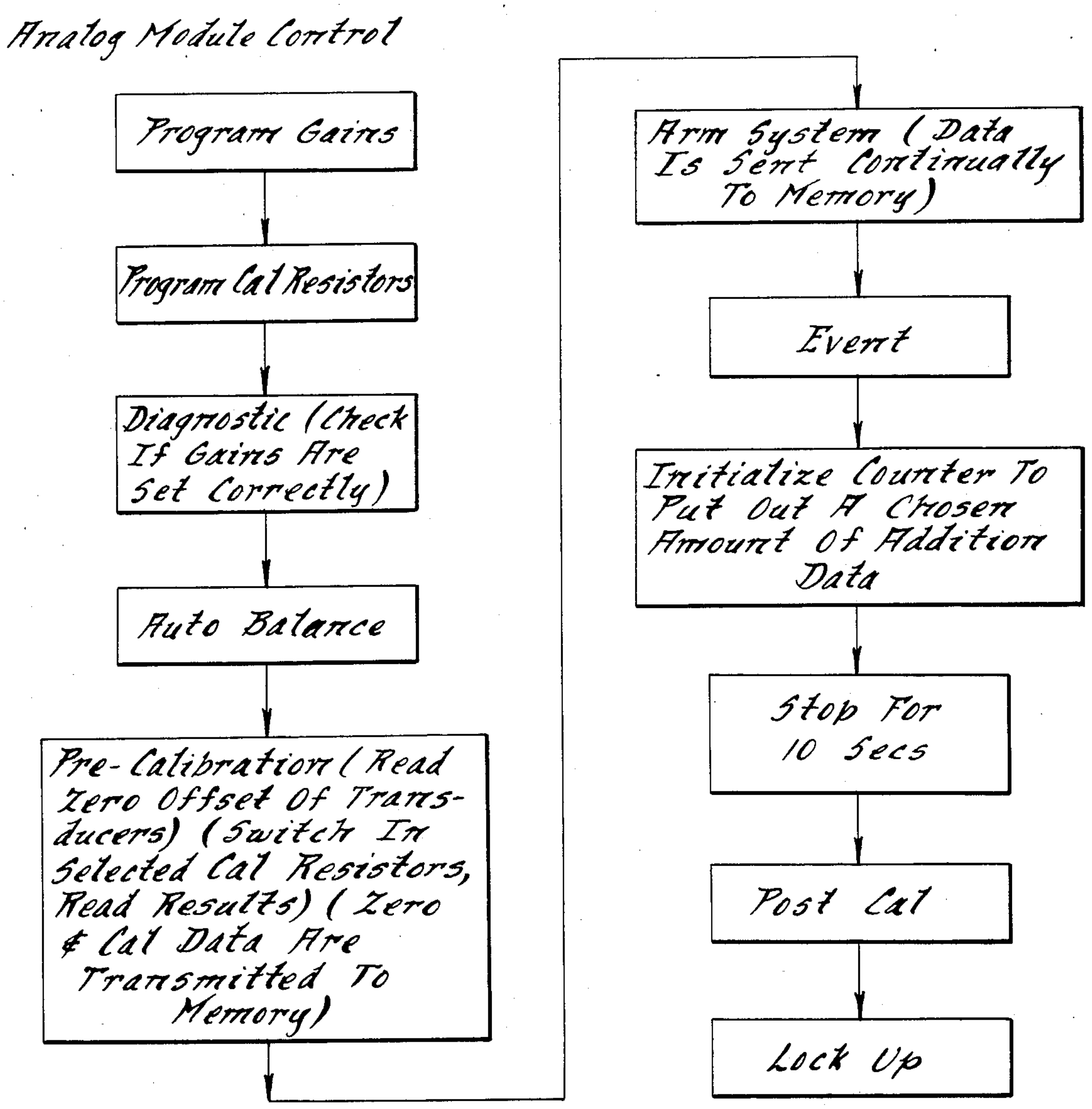
FIG. 4 is a flow chart illustrating the sequence of events associated with collecting and transmitting data in accordance with the invention.

The flow chart of FIG. 4 illustrates the sequence of events which is initiated by turning on analog module 20.

Figure 5:
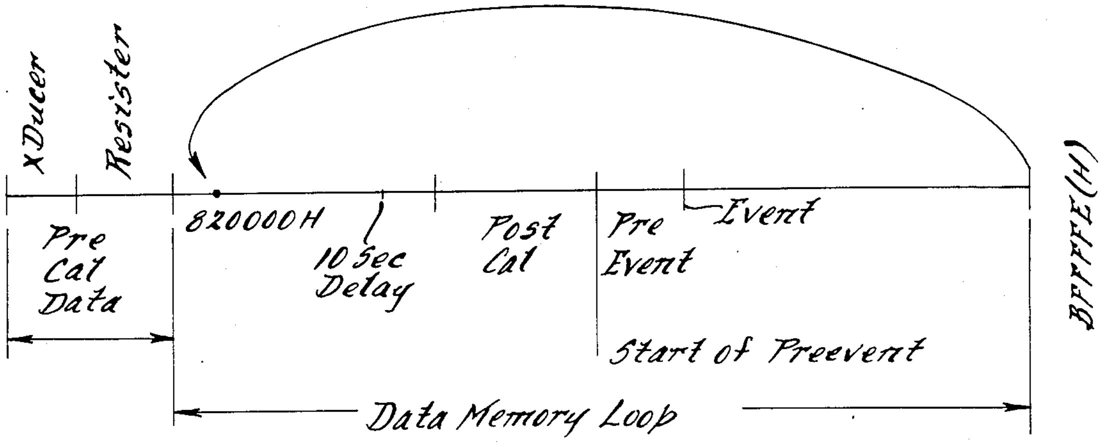
FIG. 5 is a graphical illustration of the manner data is stored in memory in accordance with principles of the invention.

FIG. 5 shows a map illustrating the manner data is stored in memory. Precal transducer and calibration resistor data is stored in a section of memory dedicated for that purpose. The arm loop shows that data is taken from several loops or cycles of the system.

What is claimed is:

1. A method of collecting and storing data from a plurality of selected rapidly changing physical phenomena in hostile environments, said collected data being stored at a location remote from the undesirable hostile environment, said method includes the steps of (a) sensing each of said physical phenomena within the hostile environments so as to provide a plurality of electrical signals proportional to each of said physical phenomena, said signals being analog signals;

(b) conditioning each of said electrical signal by amplification within a desired voltage range;

(c) filtering each of said conditioned signal in a manner opposing the occurrences of alias signals during the collecting of said data;

(d) multiplexing each of said filtered electrical signals so as to select each one of said plurality of electrical signals as an outputer signal in a chosen sequence;

(e) sampling and holding each multiplexed signal for a duration sufficient to produce an output signal proportional to the input multiplexed signal prior to receipt of another of said multiplexed signals;

(f) converting each of said sampled signal into a digital number of a predetermined bit size;

(g) adding a predetermined number of status code bits to each of said digital number to form a digital word, said digital word providing parallel data of a chosen bit size;

(h) sequentially shifting each bit of said parallel data digital word onto a signal output line in a manner providing each of said digital words as serial data;

(i) adding a clock signal of a chosen frequency to each of said serial data words;

(j) encoding each of said serial data words and said added clock signal into a chosen code format suitable for data transmission;

(k) transmitting each of said encoded serial word and clock signal as digital light signals over a fiber optic cable to a digital receiver at a location remote from the hostile environment;

(l) at said digital receiver, converting said digital light signals transmitted over said fiber optics cable into digital electric signal representations of each of said digital word and said clock signal;

(m) decoding said digital electrical signal representation so as to reconstruct each of said serial data words and said added clock signal;

(n) sequentially shifting each bit of said serial data digital words onto parallel output lines at the reconstructed added clock signal rate to reconstruct each of said digital words;

(o) decoding each status code of each of said reconstructed word so as to provide an indication of the status of each of said words;

(p) forming an address word for each of said data word, said address word forming being in response to the status of said decoded status code associated with each of said data word;

(q) providing a memory storage computer bus system, wherein said bus system includes a master computer for said bus system, and static and dynamic memories, the location of memory space in said memories being addressable by each of said formed address;

(r) transferring control of said bus system for said bus computer to said digital receiver;

(s) writing each of said data word from said digital receiver to said bus system memories and into the memory locations corresponding to the locations designated by each of said formed address word, the writing being at a predetermined writing rate that is higher than the added clock signal rate.

2. The method of claim 1 which includes terminating said writing of each of said data words at a chosen time.

3. The method of claim 1 including the step of transferring control of said bus system from said digital receiver back to said bus computer.

4. A data acquisition system for collecting and storing data from a plurality of selected rapidly changing phenomena in hostile environments, said collected data being stored at a location remote from the undesirable hostile environment, said system comprising:

(a) means for sensing each of said selected physical phenomena within the hostile environment so as to provide a plurality of electrical signals proportional to each of said physical phenomena, said electrical signals being analog signals;

(b) means for conditioning each of said plurality of electrical signals by amplification within a desired voltage range;

(c) means for filtering each of said conditioned signal in a manner opposing the occurrences of alias signals during the collecting of said data;

(d) means for multiplexing each of said filtered electrical signals so as to select each one of said plurality of electrical signals as an output signal in a chosen sequence;

(e) means for sampling and holding each multiplexed signal for a duration sufficient to produce an output signal proportional to the input multiplexed signal prior to receipt of another of said multiplexed signals;

(f) means for converting each of said sampled signal into a digital number of a predetermined bit size;

(g) means for adding a predetermined number of status code bits to each of said digital number to form a digital word, said digital word providing parallel data of a chose bit size;

(h) means for sequentially shifting each bit of said parallel data digital word onto a single output line in a manner providing each of said word as serial data;

(i) means for adding a clock signal of a chosen frequency to each of said serial data word;

(j) means for encoding each of said serial data word and said added clock signal into a chosen code format suitable for data transmission;

(k) means for transmitting each of said encoded serial word and clock signal as digital light signals over a fiber optics cable to a digital light receiver at a location remote from the hostile environment;

(l) at said digital light receiver, means for converting said digital light signals transmitted over said fiber optics cable into digital electric signal representations of each of said digital word and said clock signal;

(m) means for decoding said digital electrical signal representations so as to reconstruct each of said serial data words and said added clock signal;

(n) means for sequentially shifting each bit of said serial data digital word onto parallel output lines at the reconstructed added clock signal rate to reconstruct each of said digital words;

(o) means for decoding each status code of each of said reconstructed word so as to provide an indication of the status of each of said words;

(p) means for forming an address word for each of said data words, said address word forming being in response to the status of said decoded status code associated with each of said data words;

(q) means for providing a memory storage computer bus system wherein said bus system includes a master computer for said bus system, and static and dynamic memories, the locations of memory space in said memories being addressable by each of said formed address word;

(r) means for transferring control of said bus system from said bus computer to said digital receiver; and (s) means for writing each of said data word from said digital receiver to said bus system memories and into the memory locations corresponding to the location designated by each of said formed address word, the writing being at a predetermined writing rate that is higher than the added clock signal rate.

5. The apparatus of claim 4 including means for terminating said writing of each of said data word at a chosen time.

6. The apparatus of claim 4 including means of transferring control of said bus system from said digital receiver back to said bus computer.

* * * * *